May 23, 1961   G. A. GAYLER   2,985,796
IGNITION SYSTEMS FOR INTERNAL COMBUSTION ENGINES
Filed Dec. 28, 1959
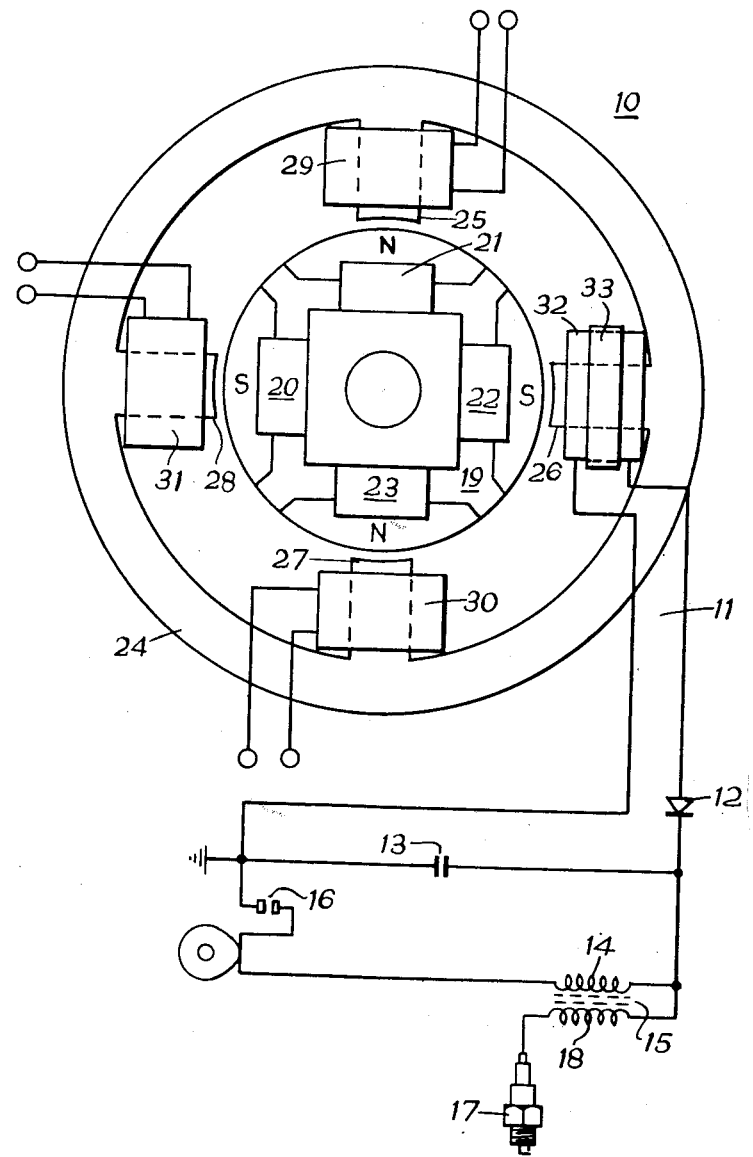
INVENTOR
GEORGE ALFRED GAYLER
BY
Craig & Freudenberg
ATTORNEY United States Patent Office 2,985,796
Patented May 23, 1961

2,985,796
IGNITION SYSTEMS FOR INTERNAL COMBUSTION ENGINES

George Alfred Gayler, Bletchley, England, assignor to Wipac Development Limited, London, England, a British company Filed Dec. 28, 1959, Ser. No. 862,382
Claims priority, application Great Britain Jan. 5, 1959
9 Claims. (Cl. 315—206)

The present invention relates to ignition systems for internal combustion engines.

It has been proposed hitherto to provide an ignition system for an internal combustion engine comprising a capacitor, make-and-break contacts and the primary winding of a voltage step-up transformer connected in series, a sparking plug being connected across the secondary winding of the transformer and means being provided for charging the capacitor.

In operation, the capacitor is charged and at every instant when firing is required the capacitor is discharged by closure of the make-and-break contacts, the discharge taking place through the primary winding of the transformer and causing a voltage to be induced in the secondary winding such as to produce a spark across the gap of the sparking plug.

It has been found that such a system will function adequately when the voltage supplied to the capacitor is of the order of 300 volts. If the capacitor is charged from an alternator through a rectifier this relatively low voltage enables a cheap rectifier and capacitor to be employed.

On some internal combustion engines, however, an alternator of substantial power of output is sometimes used, the alternator having a plurality of stator windings and a rotor carrying a plurality of permanent magnets which in operation induce currents in the stator windings.

In a simple alternator of this kind the relationship of output voltage to speed is substantially linear and although satisfactory operation may be obtained at low speeds the output voltage of the alternator may become dangerously high at high engine speeds, causing damage to the rectifier and to the capacitor.

According to the present invention an ignition system in an internal combustion engine comprises a capacitor, make-and-break contacts, and the primary winding of a voltage step-up transformer connected in series, a sparking plug connected across the secondary winding of the transformer and means being provided for charging the capacitor, the said means comprising an alternator connected through a rectifier to the capacitor, the alternator having a plurality of stator windings, only one of which is connected to the rectifier for charging the capacitor and the magnetic circuit of this one winding having a further winding which is short-circuited, the short-circuited winding serving in operation progressively to reduce the rate of increase of voltage applied to the rectifier with increase in the speed of the alternator. The short-circuited winding may be provided over the output winding, under the output winding or on another part of the magnetic circuit of the output winding.

The invention will now be described, by way of example, with reference to the accompanying drawing which shows schematically an ignition system for a single-cylinder internal combustion engine.

In the drawing a source 10 of alternating current has one output circuit 11 connected through a rectifier 12 to charge a capacitor 13. The primary winding 14 of a voltage step-up transformer 15 and make-and-break contacts 16 are connected in series across the capacitor 13. A sparking plug 17 is connected across the secondary winding 18 of the transformer 15.

In operation the capacitor is charged by the alternator 10 through the rectifier 12 and the contacts 16 are timed to close at each firing instant. When the contacts 16 close the capacitor 13 is discharged through the primary winding 14 inducing a sufficiently high voltage across the secondary winding 18 to produce a spark across the discharge gap of the sparking plug 17.

The alternator 10 is designed for supplying power to a number of other loads such as a lighting load on a vehicle and a battery-charging load and hence the rotor and magnetic circuit design are made such as to provide the necessary power. This leads to problems in supplying power to the ignition system since this imposes a light load on the alternator.

Thus a normal winding providing an output voltage increasing substantially linearly with speed would necessitate the provision of a rectifier 12 and capacitor 13 capable of withstanding a voltage of the order of 500 to 1000 volts at maximum engine speed if the output voltage is to be adequate (say 150 volts) for engine-starting purposes.

Various proposals have been made from time to time for effecting voltage limitation but all usually require ancillary equipment such as thermionic valves, transistors, saturable reactors and so on, which would add considerably to the cost and may not be desirable for application to ignition systems.

An arrangement according to the present invention provides a simple, cheap, robust and effective solution to the problem.

The alternator 10 has a rotor 19 carrying four permanent magnets, 20, 21, 22 and 23. An associated stator 24 has four poles 25, 26, 27 and 28 of which the 25, 27 and 28 are provided with single windings 29, 30 and 31 respectively. These windings are used for supplying loads such as vehicle lighting and a battery-charging circuit (not shown).

The other stator pole 26 carries a main winding 32 connected through the output circuit 11 and the rectifier 12 to charge the capacitor 13. Lying over the winding 32 there is a further winding 33 which is short-circuited.

In one example the main winding 32 has 6,000 turns of 45 S.W.G. copper wire and the short-circuited winding 33 has 640 turns of 38 S.W.G. copper wire.

With the short-circuited winding 33 removed the output from the main winding 32 increased from 330 volts at 1000 r.p.m. to 550 volts at 4500 r.p.m.

With the short-circuited winding in position the increase in output vlotage with increase in speed was initially, that is up to about 500 r.p.m., not substantially different from the increase in the absence of the short-circuited winding. Above about 500 r.p.m., however, the rate of increase progressively reduced and although the voltage was 220 volts as 1000 r.p.m. it was only 300 volts at 4000 r.p.m.

Thus over a useful range of engine speeds a capacitor of 350 volts working rating is adequate. The maximum voltage across the rectifier is also reduced facilitating design and reducing cost.

Although the transformer 15 is shown as an autotransformer, it can have separate primary and secondary windings.

I claim:
1. An ignition system including a voltage step-up transformer having primary and secondary windings for an internal combustion engine, comprising a capacitor, make-and-break contacts, and the primary winding of said voltage step-up transformer connected in series, a spark- ing plug connected across the secondary winding of the transformer, an alternator, a rectifier, and means connecting the alternator through the rectifier to the capacitor, the alternator having a plurality of stator windings, only one of which is connected to the rectifier for charging the capacitor and the magnetic circuit of this one winding having a further winding which is short-circuited, the short-circuited winding serving in operation progressively to reduce the rate of increase of voltage applied to the rectifier with increase in the speed of the alternator.

2. An ignition system according to claim 1 wherein the short-circuited winding lies over the said one winding.

3. An ignition system according to claim 1 including means for connecting another of said stator windings to a load circuit for energization of the latter with an output voltage versus speed relationship that is substantially nearer linear as compared with the voltage versus speed relationship of said one winding.

4. An ignition system including a voltage step-up transformer having primary and secondary windings for an internal combustion engine, comprising a capacitor, make-and-break switching means, and the primary winding of said voltage step-up transformer connected in a series, a spark plug connected across the secondary winding of the transformer, an alternator, a rectifier, and means connecting the alternator through the rectifier to the capacitor, said alternator having a stator winding which is connected to the rectifier for charging the capacitor, said alternator having a magnetic circuit for said winding, a further winding, which is short-circuited, on said magnetic circuit serving in operation to progressively reduce the rate of increase of voltage applied to the rectifier with increase in the speed of the alternator.

5. An ignition system according to claim 4 wherein the short-circuited winding comprises a plurality of turns connected in series.

6. An ignition system according to claim 4 wherein the short-circuited winding encircles said one winding.

7. An ignition system for an internal combustion engine comprising an alternator having a stator winding, a rectifier, a capacitor, means for connecting said stator winding to charge said capacitor through said rectifier, discharge circuit means for said rectifier including, in series, a make-and-break switching means and means including a spark plug for said engine, said alternator having a magnetic circuit on which said stator winding is wound, and a further winding, which is short-circuited, on said magnetic circuit serving in operation to progressively reduce the rate of increase of voltage applied for charging said capacitor with increase in rotary speed of the alternator.

8. An ignition system according to claim 7 wherein said short-circuited winding comprises a plurality of turns in series immediately adjacent to said first-mentioned winding.

9. An ignition system according to claim 7 wherein said alternator includes at least one further independent output winding and a respective magnetic circuit therefore, and means for connecting said independent output winding for energization of a load with a voltage versus speed relationship that is nearer linear than the voltage versus speed relationship of said first-mentioned winding.

References Cited in the file of this patent

UNITED STATES PATENTS

| | | |
|---|---|---|
| 613,205 | Hutin et al. | Oct. 25, 1898 |
| 1,412,933 | Gordon | Apr. 18, 1922 |
| 2,071,573 | Randolph et al. | Feb. 23, 1937 |
| 2,645,746 | Bruijning | July 14, 1953 |